(No Model.)

H. S. MALTBY.
ADJUSTABLE BUTTER MOLD.

No. 540,839. Patented June 11, 1895.

Witnesses:

Inventor,
Herbert S. Maltby
By Dewey & Co.
Atty

UNITED STATES PATENT OFFICE.

HERBERT SANFORD MALTBY, OF CLARKSVILLE, CALIFORNIA.

ADJUSTABLE BUTTER-MOLD.

SPECIFICATION forming part of Letters Patent No. 540,839, dated June 11, 1895.

Application filed October 22, 1894. Serial No. 526,613. (No model.)

*To all whom it may concern:*

Be it known that I, HERBERT SANFORD MALTBY, a citizen of the United States, residing at Clarksville, El Dorado county, State of California, have invented an Improvement in Adjustable Butter-Molds; and I hereby declare the following to be a full, clear, and exact description of the same.

My invention relates to that class of butter molds in which provision is made, by the use of a filling strip between the meeting edges of the mold sections, for varying the capacity of the mold, to compensate for changes in temperature and shrinkage, thus adapting the mold for the production of rolls or squares of given weights under any circumstances.

My invention consists in a butter mold, between the meeting edges of both the back and front of which are seated filling strips, and also, in a mold, having, in addition to said filling strips, the back edges of its sections adjustably connected by its hinges whereby the mold may be additionally varied in capacity, and inaccuracies attendant upon such increased capacity, corrected.

In Patent No. 524,147, issued to me August 7, 1894, a mold is shown having adjustable hinges and a filling strip between its hinged edges only. This, while adapted to small variations in round molds, is not applicable to larger variations, and cannot be applied at all to a square mold. This is on account of the inaccuracy in shape due to having the filling strip on one side only of the mold, and this inaccuracy becomes more noticeable in round molds as the variation in capacity is greater, and is always apparent and undesirable in square molds; but by having the filling strips at both back and front, these objections are obviated and the capacity of both round and square molds may be varied considerably to obtain the compensations desired, without affecting the appearance of the molded product. This is the object of my present invention.

Figure 1:
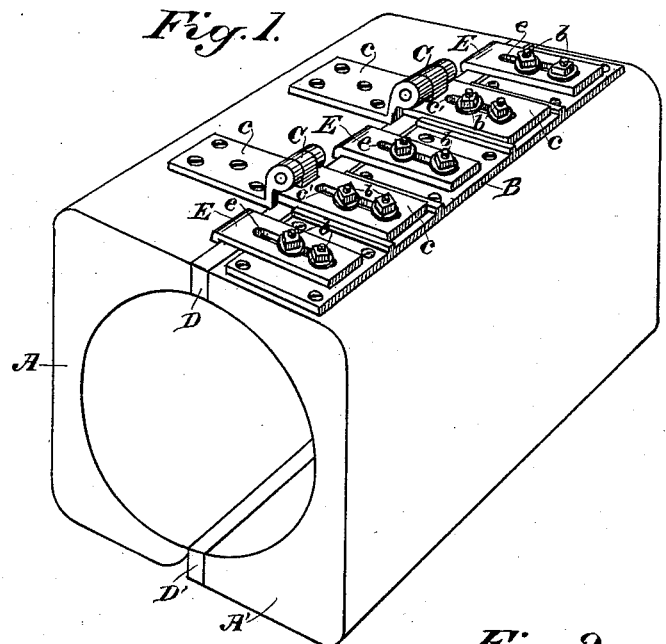
Figure 2:
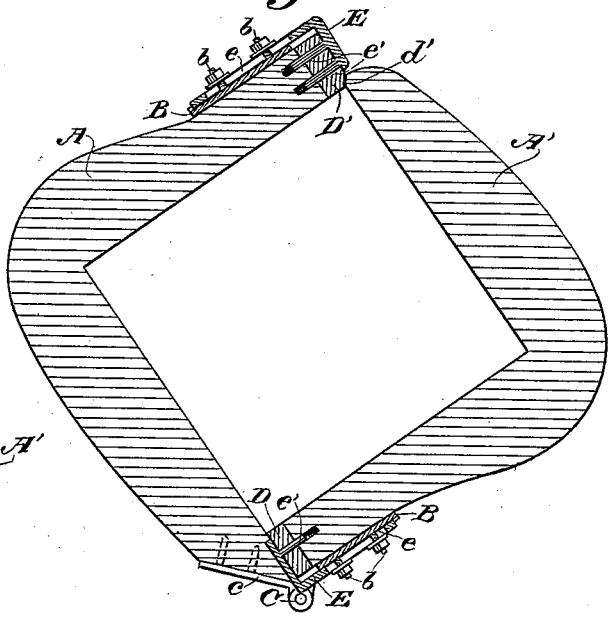
Figure 3:
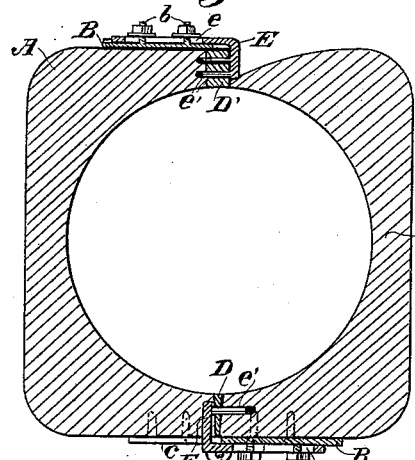

Referring to the accompanying drawings for a more complete explanation of my invention, Figure 1 is a perspective view of my round mold, showing the filling-strips at both back and front and in addition showing adjustable or extensible hinges at the back. Fig. 2 is a cross-section of my square mold, showing the same improvements. Fig. 3 is a cross-section through the adjustable catches of my mold, which may be round or square, (here shown as round,) and which is provided with filling-strips at both back and front, but having non-adjustable hinges.

In Fig. 1, A A' are the mold sections. The adjacent edges of the two sections on the back are connected by the hinges C, the lap plates $c$ of which are in suitable manner, and as in my previous patent, adjustably connected with said sections. The lap plates on each side may be thus adjustably connected, or, as here shown, one side may be connected rigidly, and the other side adjustably, as by means of the slots $c'$ therein, sliding over fixed studs or short bolts $b$ rising from the channeled guide plates B screwed to the sections. This adjustment on one side of the hinge only, is made possible because of the adjustment at the other side of the mold, which I shall presently describe, the two adjustments equalizing the increasing or diminishing interior space of the mold.

Between the mold sections is the filling strip D which is held to its place by the catches E which are adjustably secured to one of the mold sections by means of elongated slots $e$ therein fitting over studs $b$.

In order to more accurately hold the filling strip in place, I have a short pin $e'$ on the face of the catch E which said pin passes through a suitable hole or socket in the filling strip, and may enter a socket in the body of the mold section. On the other or front side of the mold, where the adjacent edges separate and come together in opening or closing, I have similar catches E (see Figs. 2 and 3) adjustable on the mold section as on the other side, said catches having similar pins $e'$ and adapted to hold to place a filling strip D', (Figs. 1, 2 and 3.) It will thus be seen that by providing a filling strip for both sides of the mold, the latter will be kept true to its shape no matter what may be its adjustment, and thus a considerable variation in capacity may be had; whereas, if the filling strip be placed on one side only, much variation, even in a round mold, would noticeably affect the shape, while it would be practically impossible in the square mold, and a slight variation would be readily noticeable.

In Fig. 2, the only difference from Fig. 1, is that a square mold is shown, and according to the requirements of this shape, it will be noticed that the filling strip D' at the front has its lower outer edge beveled at $d'$, and the adjacent edge of the mold section correspondingly beveled, thereby avoiding that weakening tendency which would result if the edge of the mold section projected over, or overlapped the filling strip directly. This bevel at $d'$ should be in line with the hinge center in order to insure the greatest possible strength. In this square mold also, the filling strip D, at the back, need not be so thick as the one D' at the front, nor need the catches E, at the back, be as strong as those at the front as the strain on them is not so great.

The mold of Fig. 3 is distinguishable from those of Figs. 1 and 2 in that, while using a filling strip both at front and back, the hinges C are not adjustable; that is to say, they do not adjustably connect the mold sections. The necessity for the back filling strip in this case is that when a front filling strip is used the inner edges of the back of the sections do not come together, but leave a tapering space into which the butter is squeezed; but by having a filling strip at this point also, this space is closed. With a mold of this kind sufficient variation may be had for many purposes even without adjustable hinges. Whether one or the other form be used, namely, the one with adjustable hinges, or the one without will depend upon the wishes of the dairyman. Some dairymen would prefer the adjustable hinge in connection with the two opposite filling strips, because it allows of considerable variation in size of either round or square molds without materially altering their shape. Other dairymen who want only a slight variation in size of mold or who are not particular as to the exactness of the shape of roll or square, would prefer the non adjustable hinge in combination with the two opposite filling strips, on account of a less cost.

Having thus described my invention, what I claim as new, and desire to secure by Letters Patent, is—

1. A butter mold the sections of which are adjustably connected to their hinges whereby they may be separated or brought closer together, and an adjustably connected filling piece for the space between the hinged edges of said sections, and also for the space between the opening and closing edges of the sections.

2. In combination in a butter mold the sections of which are connected to their hinges whereby they may be opened and closed, a filling piece seated between the hinged edges of the sections and a second filling piece seated between the opening and closing edges of said sections, catches adjustably mounted on opposite sides of the mold having pins passing through the filling pieces to connect them with the mold.

In witness whereof I have hereunto set my hand.

HERBERT SANFORD MALTBY.

Witnesses:
J. A. MORGAN,
JOHN BRANDT.